Sept. 15, 1964   G. LE ROY   3,148,543
SIGHT GLASS FOR REACTION VESSELS
Filed May 31, 1961

INVENTOR
GENE LE ROY

BY Cushman, Darby & Cushman
ATTORNEYS

– – –

United States Patent Office 3,148,543
Patented Sept. 15, 1964

3,148,543
SIGHT GLASS FOR REACTION VESSELS
Gene Le Roy, Box 1291, Huntington, W. Va.
Filed May 31, 1961, Ser. No. 113,915
8 Claims. (Cl. 73—331)

This invention relates to a sight glass for use with reaction vessels. More particularly, this invention relates to a sight glass adapted to resist attack of the contents of the vessel on the glass and to withstand substantial variation in temperature and pressure.

Sight glasses commonly in use with such vessels consist, as a rule, of a single piece of glass of suitable composition to meet the stresses due to corrosion and to changes of temperature and pressure. These glasses are conventional mounted in the wall of said vessel in a suitable holder. However, the glasses are vulnerable to breakage due to improper packing of the glass in the holder and to uneven tension on the holder when mounted on the vessel. Moreover, if breakage does occur, the glass oftentimes cannot support the pressure in the vessel and may shatter before it can be replaced.

It has also been known to form sight glass lenses of several layers of glass, either independent of one another or bonded to form a laminate. However, these lenses due to their thickness, are very rigid, and even more vulnerable to breakage due to improperly adjusted packing or uneven tension on the holder. Also, when these multiple layer lenses need replacement, it is a complicated and tedious procedure, and the vessel is out of operation for extended periods of time. In all known sight glasses, there is great difficulty in maintaining a tightly sealed joint between the lens and the support.

It is therefore an object of this invention to provide a sight glass for reaction vessels which overcomes the disadvantages of the prior art.

It is another object of this invevntion to provide a sight glass in which the dangers of breakage due to improper packing and uneven tension are eliminated.

It is a further object of this invention to provide a sight glass wherein replacement of damaged lenses is efficiently and quickly performed.

In accordance with the present invention, a sight glass is provided which has two major components, a lens holding sleeve and a mounting support. The lense holding sleeve is adapted to receive the lens and is further provided with a flange to seat against an opening in a reaction vessel. The sleeve is received in the mounting support which is provided with means to secure the flange of the lens holding sleeve in fixed engagement with the vessel. In the construction contemplated the lens is completely surrounded at points of stress by resilient gaskets and the lens is not subject to stresses except those from within the vessel.

The invention will be well understood by reference to the following description of an illustrative embodiment thereof shown by way of example in the accompanying drawings wherein.

Figure 1:
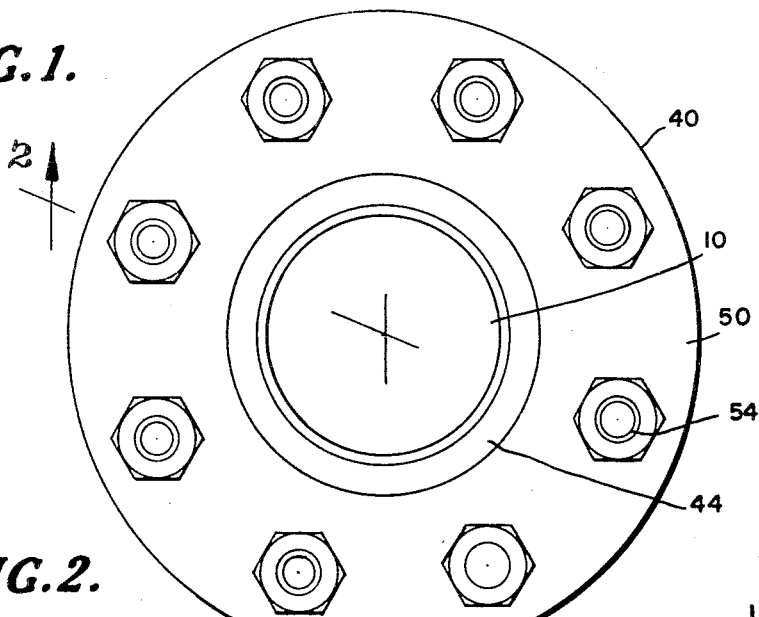
FIGURE 1 is a top plan view of a sight glass.
Figure 2:
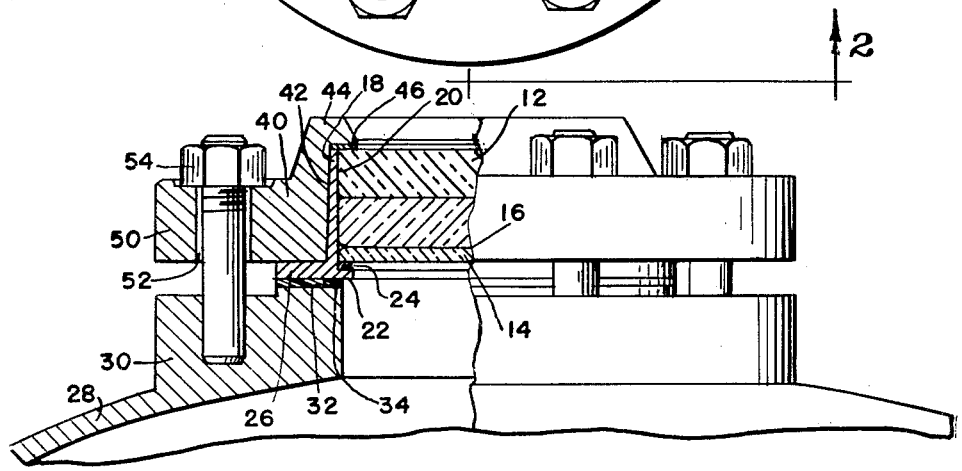
FIGURE 2 is a side view of the sight glass partly in section taken along line 2—2 of FIGURE 1.

Referring now to FIGURES 1 and 2 of the drawings, the sight glass there shown comprises a laminated lens, generally 10, consisting of two discs 12 of tempered glass shielded with a thinner disc 14 of chemically resistant glass. The discs are all precision ground and bonded together at 16 by a heat and light resistant non-rigid laminate. The laminated lens is bonded in lens holding sleeve 18, preferably formed of stainless steel, by a glass-metal bond, generally at 20, of a specially compounded high temperature, high shear strength cohesive. The lens holding sleeve is provided with an inwardly projecting annular lip 22 at one end thereof. Mounted on said lip is a resilient gasket 24. The lens rests on the resilient gasket and substantially fills lens holding sleeve 18 but does not project therebeyond. When the sight glass is assembled, the gasket 24 is in an interposed position between the lens and lip 22 and seals the space therebetween. Lens holding sleeve 18 is further provided with an outwardly projecting annular flange 26 opposite inwardly projecting lip 22, and the outer surface of the sleeve is slightly tapered from said flange. The flange is adapted to engage wall 28 of the reaction vessel. In the embodiment shown, wall 28 has a flanged pad 30 which provides a seat 32 for gasket 34 interposed between the seat and flange 26.

In order to secure the lens holding sleeve in fixed engagement with the wall of the vessel, there is provided a mounting support 40, preferably of forged steel. The support is provided with a substantially centrally disposed bore 42 having inner and outer ends and adapted to receive lens holding sleeve 18 from the inner end thereof. The bore is preferably slightly tapered from the inner end thereof and is terminated at its outer end by an inwardly projecting annular flange 44. A second resilient gasket 46 is mounted on flange 44 within bore 42.

Mounting support 40 is adapted at the portion adjacent the inner end of bore 42 to seat against flange 26 of lens holding sleeve 18. The length of bore 42 is such that when the sight glass is assembled, sufficient pressure is exerted against gasket 46 and lens holding sleeve 18 to form an effective seal. Since the lens does not project beyond the end of the sleeve, no excess stress is exerted on said lens. Mounting support 40 is further provided with an annular base flange 50 having a plurality of bores 52 therein. Mounting bolts 54 are adapted to extend through bores 52 and to be received in flanged pad 30 of wall 28 of the vessel. In this manner, flange 26 of lens holding sleeve 18 is secured in fixed engagement with gasket 34 and seat 32 of the flanged pad with little or no pressure against the lens.

Figure 3:
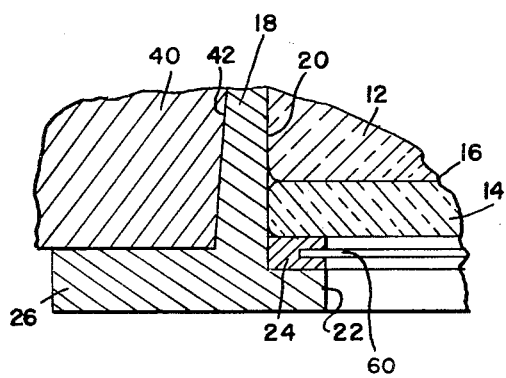
FIGURE 3 is an enlarged sectional view of a portion of the sight glass showing the seal between the lens and lens holding sleeve.

The drawings show the various parts of the sight glass in the assembled position. In FIGURE 3, an enlarged view of a portion of the assembled sight glass is presented. In this view, disc 14 of chemically resistant glass is shown in position in lens holding sleeve 18 and abutting against resilient gasket 24. The gasket is preferably provided with an inwardly facing continuous slit 60 which is adapted to be expanded and enlarged by pressure within the vessel to maintain the seal between the body of the lens and lip 22 of the lens holding sleeve.

Normally the tempered glass disc 12 and the chemically resistant glass disc 14 are first assembled and bonded to form the laminated lens. Resilient gasket 24 is placed in position within the lens holding sleeve and is supported by the inwardly projecting annular lip. The laminated lens is inserted into the lens holding sleeve with the chemically resistant disc supported by the resilient gasket. When the lens is thereafter bonded in place by the glass-metal cohesive, there is produced a unitary lens subassembly of substantial strength. The sleeve, preferably tapered, is thereafter inserted into the matching tapered bore of lens mounting support 40 with the second resilient gasket 46 already in place to form a completed sight glass. When mounted on the reaction vessel, flange 26 of the lens holding sleeve is in fixed engagement with seat 32 of the reaction vessel and held in place by mounting support 40 by means of bolts 54 received in flanged pad 30 of the reaction vessel wall. Also, the chemically resistant disc of the laminated lens is in association with the opening in the reaction vessel and thereby shields the tempered glass disc from corrosion.

Ideally, the laminated lens should completely fill the lens holding sleeve but should not project beyond the end thereof. If the lens were thicker and projected, the glass would be put under compression before a tight seal could be made at the end of the sleeve with the second resilient gasket against the flange of the mounting support. Each disc of tempered glass is designed for the normal rated working presssure of the lens mounting support. For purposes of description this working pressure is designated as having a value 10 and each of the tempered discs therefore has a safety factor of 10. This factor of safety may also be defined as the ratio, allowed for in design, between the breaking load on a member or structure and the safe permissible load thereon. With the use of two tempered discs, one supporting the other, the principal safety feature of the sight glass of this invention is provided. That is, if breakage of one tempered disc should occur, the other will support the vessel pressure until the unit can be replaced. Also, by providing two tempered discs during operation of the vessel, the original safety factor of 10 is doubled.

With the laminated lens and lens holding sleeve supported in the mounting support and entirely surrounded by resilient material, all unnecessary strain on the lens, due to improperly adjusted packing or unequal tightening of the bolts, is eliminated. Since no lens packing material is necessary in the sight glass of this invention, all danger of leakage and the difficulties of repacking are obviated. The ease with which a broken or otherwise unsuitable lens may be replaced is apparent. The mounting support is dismounted from the vessel, the sleeve removed, and a new lens holding sleeve with lens bonded in place is substituted. The sight glass is then ready for immediate remounting on the vessel.

The materials used in the production of the sight glass do not form a part of this invention, and it is to be understood that any material having the desired characteristics may be used. For example, the mounting support is preferably formed of forged steel because of its inherent strength. The lens holding sleeve is preferably formed of stainless steel but can be made of any desired alloy material. It is noted that since it is a portion of the lens holding sleeve which engages the reaction vessel, it is not necessary that any part of the mounting support be modified to perform this function. It is also not necessary that the mounting support be formed of stainless steel or a similar alloy.

Regarding other materials utilized in production of the sight glass, any heat and light resistant non-rigid bond such as silicon may be used to form the laminated lens. Similarly, any high temperature, high shear strength, chemically resistant glass-metal cohesive may be used to bond the lens to the lens holding sleeve. One such group of materials is the epoxy resins. The resilient gaskets are preferably formed of Teflon, although other materials including asbestos and rubber may be substituted.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A sight glass for cooperation with an opening in a reaction vessel, said sight glass comprising an annular lens holding sleeve having an outwardly projecting continuous annular flange at one end thereof engaging the wall of the vessel surrounding said opening, said sleeve also having at said one end an inwardly projecting annular lip, a lens received within said sleeve and substantially filling the same but not projecting therebeyond, a resilient gasket interposed between and sealing the space between the lens and the lip, and a mounting support receiving the lens holding sleeve and seated on the flange thereof to limit the pressure applied by the support to the gasket and the lens, said support also securing the flange of the lens holding sleeve in fixed engagement with the wall of said vessel and in alignment with said opening.

2. The sight glass according to claim 1 wherein the lens comprises at least two discs of tempered glass shielded by a disc of chemically resistant glass, and a layer of non-rigid bond interposed between and extending throughout the entire area of each of the opposed faces of said discs to form a laminate, said laminated lens being received in the lens holding sleeve with the chemically resistant disc adjacent the resilient gasket.

3. The sight glass according to claim 2 wherein said laminated lens is bonded in said lens holding sleeve with a high shear strength cohesive.

4. The sight glass according to claim 1 wherein said resilient gasket is provided with an inwardly facing continuous slit adapted to be expanded by pressure within the vessel to maintain the seal between the lens and the lip of said lens holding sleeve.

5. The sight glass according to claim 1 wherein said lens mounting support has a substantially centrally disposed bore therein having inner and outer ends, said bore receiving the lens holding sleeve from the inner end thereof, said support also having an inwardly projecting annular flange defining the outer end of said bore, and a second resilient gasket supported on said flange within said bore and sealing the space between the lens holding sleeve and the flange.

6. The sight glass according to claim 5 wherein the lens comprises at least two discs of tempered glass shielded by a disc of chemically resistant glass, and a layer of non-rigid bond interposed between and extending throughout the entire area of each of the opposed faces of said discs to form a laminate, said laminated lens being received in the lens holding sleeve with the chemically resistant disc adjacent the resilient gasket.

7. The sight glass according to claim 6 wherein said laminated lens is bonded in said lens holding sleeve with a high shear strength cohesive.

8. The sight glass according to claim 5 wherein the bore is tapered from its inner end and the lens holding sleeve is correspondingly tapered to fit said bore.

References Cited in the file of this patent

UNITED STATES PATENTS

| | | |
|---|---|---|
| 798,656 | Bosworth | Sept. 5, 1905 |
| 2,155,270 | Johnson | Apr. 18, 1939 |
| 2,331,917 | Kocher | Oct. 19, 1943 |
| 2,426,800 | Triplett | Sept. 2, 1947 |
| 2,942,469 | Le Roy | June 28, 1960 |

FOREIGN PATENTS

| | | |
|---|---|---|
| 849,909 | Germany | Sept. 18, 1952 |
| 923,093 | Germany | Feb. 3, 1955 |